United States Patent [19]
Bruckner

[11] 3,790,818
[45] Feb. 5, 1974

[54] SUPPLY VOLTAGE AND CLOCK SIGNAL MONITOR

[75] Inventor: Ronald L. Bruckner, Dayton, Ohio

[73] Assignee: The National Cash Register Company, Dayton, Ohio

[22] Filed: Mar. 26, 1973

[21] Appl. No.: 344,826

[52] U.S. Cl............ 307/235 R, 307/233, 330/30 D
[51] Int. Cl.......................... H03k 5/00, H02h 3/26
[58] Field of Search.... 307/233, 235; 328/147, 148, 328/259; 340/248 A, 248 B, 253 N; 317/81; 330/30 D

[56] References Cited
UNITED STATES PATENTS
3,731,118    5/1973    Harms........................... 307/235 R Primary Examiner—John Zazworsky
Attorney, Agent, or Firm—J. T. Cavender; Albert L. Sessler, Jr.; Edward Dugas

[57] ABSTRACT

In the present disclosure, a first supply voltage is monitored by a first differential amplifier through comparison with a reference potential. Clock pulses are monitored by an R-C diode network. The outputs from the first differential amplifier and the R-C diode network are applied to one input of a second differential amplifier. The other input of the second differential amplifier monitors a second supply voltage, with the output signal of the second differential amplifier being a signal which assumes a first state when the first and second supply voltages are of a proper value and the clock rate is also of a proper value. If either supply voltage or the clock period is not of a proper value, the output signal assumes a second state.

8 Claims, 1 Drawing Figure

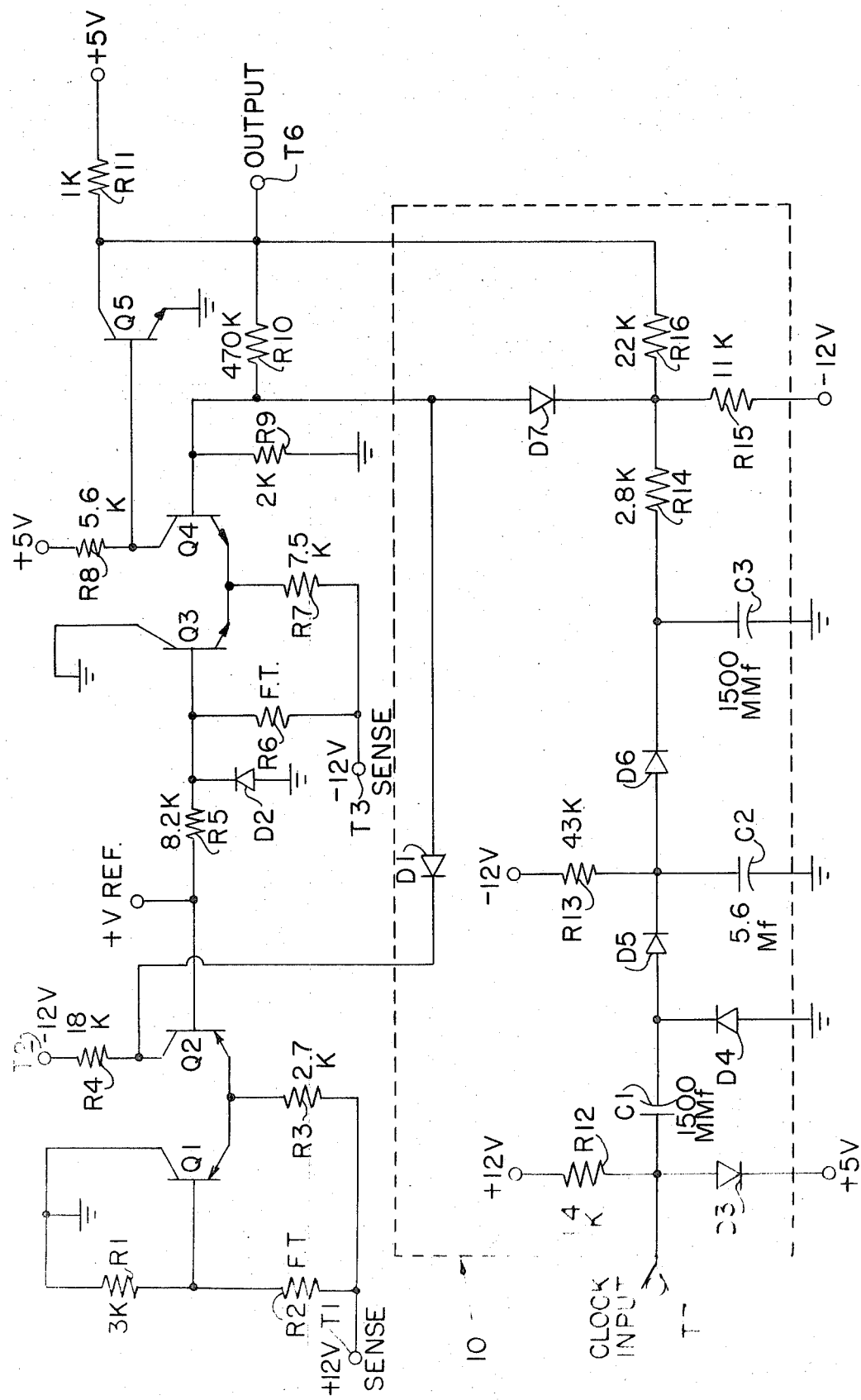

3,790,818

SUPPLY VOLTAGE AND CLOCK SIGNAL MONITOR

BACKGROUND OF THE INVENTION

Systems which utilize a number of independent supply voltages from time to time have one or more of the supplies fail. Operation of the overall system in a deteriorated mode generally continues on until the failure is detected. Voltage supply monitors for each supply can be added to the system but even then the monitors must each be monitored to determine if a failure has occurred. With digital systems that utilize clock pulses of a fixed period, a shift in the period of the pulses, caused by a malfunction, can also go undetected for a period of time. A clock pulse malfunction will generally cause errors in the output data, which errors would not be detectable unless compared against known correct data. It therefore would be highly desirable to have a monitor which would provide an output signal of one state when all sensed or monitored signals were of a proper value and of another state when one or more of the monitored signals were not of a proper value.

SUMMARY OF THE INVENTION

The circuit of the present invention is comprised of a first and second differential means. The first differential means compares a first supply voltage against a reference voltage to supply a positive output signal only when the difference between the compared voltages is below a tolerable level. Additional means are provided for monitoring clock pulses and for providing a clock condition signal when the clock pulse rate equals or exceeds a predetermined rate. The second differential means receives as inputs the output signal from the first differential means and the clock condition signal from the clock monitoring means on one input and compares these signals against a second supply voltage and the reference voltage at another input. The output of the second differential means assumes a first state when the difference is at or below a tolerable level, that is, the first and second supply voltages are of a proper value and the clock period is of a proper rate. The output assumes a second state when the difference is above the tolerable level, that is, the voltages are not of a proper value and/or the clock period is not of a proper rate.

From the foregoing, it can be seen it is an object of the present invention to provide a system for monitoring two or more electrical signals which system provides an output signal, the state of which is dependent on the condition of the input signals.

It is another object of the present invention to provide an improved system for monitoring a plurality of electrical signals and for providing an output signal indicative of the condition of the monitored signals.

It is a further object of the present invention to provide an improved system for monitoring supply voltages and clock pulses which are to be applied to a digital system.

These and other objects of the present invention will become more apparent when taken in conjunction with the following description and drawings, throughout which like characters indicate like parts and which drawings form a part of this application.

BRIEF DESCRIPTION OF THE DRAWINGS

The FIGURE is a schematic diagram of a preferred embodiment of the invention.

DESCRIPTION OF A PREFERRED EMBODIMENT OF THE INVENTION

Referring to the FIGURE a first differential amplifier comprised in part of transistors Q1 and Q2 is operated to detect a variance in the +12 volt supply at the sense terminal T1. The terminal T1 is connected to the emitters of transistors Q1 and Q2 through resistor R3, and to the base of transistor Q1 through resistor R2. The base of transistor Q1 is connected to ground through resistor R1. The collector of transistor Q1 is also connected to ground. The collector of transistor Q2 is connected to a −12 volt supply at the terminal T2 by means of resistor R4. The base of transistor Q2 is connected to a +V reference supply which in the preferred embodiment has a value of +6.9 volts.

A second differential amplifier comprised in part of transistors Q3 and Q4 is operated to detect a variance in the −12 volt supply at the sense terminal T3. The emitters of transistors Q3 and Q4 are connected to the −12 volt supply at the sense terminal T3 by means of a resistor R7. The base of transistor Q3 is connected to terminal T3 by a resistor R6 and to the +V reference by means of resistor R5. A diode D2, connected at the base of transistor Q3 to ground, operates in a normal forward or zero bias mode. The collector of transistor Q3 is connected directly to ground. The collector of transistor Q4 is terminated to a +5 volt supply by means of resistor R8. The collector of transistor Q4 is in addition connected directly to the base of transistor Q5. The emitter of transistor Q5 is connected directly to ground. The collector of transistor Q5 is connected to the +5 volt supply by means of resistor R11 and by a direct connection to output terminal T6. The base of transistor Q4 is connected to the output terminal T6 by means of resistor R10 and to ground by resistor R9.

In operation, transistors Q1 and Q2 operate in a differential mode to compare the level of the +12 volt supply against the reference supply, +V reference. In a like manner, transistors Q3 and Q4 sense the level of the −12 volt supply and compare this level against the reference supply, +V reference. If either supply is below the level set by the reference supply the output stage (transistor Q5) is held at its low level, which is approximately 0 volts. In partial summary, the two differential amplifiers operate to provide a signal at the output terminal T6 which signal will be of a 0 state if either/or both the + or −12 volt supply is below the threshold set by the positive reference, +V reference. In the preferred embodiment shown the threshold is 11.2V absolute.

As an illustrating example, if the voltage on terminal T1 drops below +11.2V, the voltage on the base of transistor Q1 becomes more negative turning transistor Q1 on. Simultaneously the voltage on the emitters of Q1 and Q2 decrease a like amount, but the voltage on the base of Q1 has a greater effect on the transistor Q1 so it tends to saturate. As transistor Q1 conducts it draws the emitter voltage level towards the voltage level of the collector, in this case ground. Transistor Q2 with its base fixed at the +V reference potential of +6.9V tends to turn off because its emitter electrode is becoming less positive with respect to the potential on its base. As transistor Q2 turns off the potential at its collector electrode approaches the −12V applied to terminal T2. The increased negative potential on the collector of transistor Q2 causes a current to flow through resistors R9, R10, and R11 from ground and from the +5V supply respectively. The current flow through diode D1 causes a negative potential to be felt on the base of transistor Q4 which turns transistor Q4 off. The collector of transistor Q4 then rises to the +5V potential applied to resistor R8 which in turn is applied to the base of transistor Q5, turning transistor Q5 on. With transistor Q5 on, the output terminal is placed at approximately zero volts or ground potential. When the voltage on terminal T1 is above +11.2V transistor Q2 conducts and diode D1 is back biased and does not conduct. The +5 volts applied through resistors R9, R10, and R11 is then felt as a positive bias on the base of transistor Q4 causing it to conduct. When Q4 is conducting its collector voltage lowers towards the voltage applied to its emitter, in this case, towards the −12V applied at terminal T3. Transistor Q5 is cut off by the lowering of the voltage on its base, which in turn causes the emitter (output terminal T6) to rise to the +5V potential applied to resistor R11.

Transistors Q3 and Q4 operate in an identical manner absent the inputs from diodes D1 and D7 except that the base of transistor Q3 is clamped to approximately −0.7V for negative potentials applied to the base of transistor Q3.

When the potential on terminal T3 drops to −11.2 or less transistor Q4 is turned off causing the output terminal T6 to drop towards a zero potential.

The output signal on terminal T6 will be high, approximately +5 volts, if the supply voltages are above the threshold and the clock rate is of sufficient magnitude.

The clock period sensing circuit 10 provides an output signal which is a function of clock rate. The clock signals which have an amplitude excursion between zero volts and at least +5.7 volts are fed to the clock input terminal T7. Terminal T7 is connected to the junction of resistor R12, capacitor C1, and diode D3. Resistor R12 connects the + 12 volt supply to the capacitor C1. Diode D3 is connected to the +5 volt supply and limits the most positive excursion of the clock input terminal to approximately +5.7 volts. Diode D4 connects capacitor C1 to ground in a back-biased configuration. Diode D5 connects capacitor C1 to the junction of Capacitor C2, resistor R13, and diode D6, in a forward-biased configuration. Resistor R13 is connected to the −12 volt supply. Capacitor C2 is connected to ground. Diode D6 is connected to ground by capacitor C3. The junction of diode D6 and capacitor C3 is connected to the junction of diode D7, resistor R16, and resistor R15, by means of resistor R14. Diode D7 is connected directly to the base of transistor Q4, and to the collector of transistor Q2 by means of diode D1. Resistor R16 is connected directly to the output terminal T6. Resistor R15 is connected to the −12 volt supply.

In operation, the condition of the clock pulse signal is sensed through the voltage produced across capacitor C3 by the transfer of charge from capacitors C1 and C2 during each clock cycle. If the clock rate is low or erratic, the potential across C3 will prevent transistor Q4 from conducting, thereby holding the output of terminal T6 at a low level. The output terminal T6 is at a high level only when the supply voltages are above 11.2 volts, absolute value, and the clock rate has been proper for a period of time set by the delay capacitor C2. In the preferred embodiment, the monitored clock rate had a frequency of 864 KC and the values shown in the drawing for the various components correspond to this particular rate. The circuit will operate with lower or higher clock rates by the proper selection of capacitors C1, C2, C3, and resistors R14 and R15. Resistors R2 and R6 may be functionally trimmed to provide a vernier calibration of the thresholds for the first and second differential amplifiers respectively as indicated by the letters F.T. appearing adjacent to these resistors in the drawing. Resistors R2 and R6 have a nominal value of 1.9K and 13K, respectively.

While there has been shown what is considered to be a preferred embodiment of the invention, it will be manifest that many changes and modifications may be made therein without departing from the essential spirit of the invention. It is intended, therefore, in the annexed claims to cover all such changes and modifications as may fall within the true spirit and scope of the claims.

What is claimed is:

1. A monitor circuit for sensing the supply voltages and the rate of a clock signal applied to an electronic circuit and for providing a monitor output signal, the state of which indicates the condition of the supply voltages and clock signal, comprising in combination:

a reference voltage source;
   a first differential means for comparing a first supply voltage against said reference voltage and for providing an output when the amplitude of the first supply voltage is at or above a desired operating range as compared against said reference voltage;
   clock rate means for receiving a clock signal and for converting the rate of said clock signal into a clock condition signal, the amplitude level of which indicates the rate of said clock signal; and
   a second differential means for receiving a second supply voltage and said reference voltage and for comparing the difference between said second supply voltage and said reference voltage against the difference between said clock condition signal and said first differential means output signal to provide said monitor output signal, which output signal assumes a first state when the difference between all compared voltages and signals is equal to or less than a selected threshold and assumes a second state when the difference between all compared voltages and signals is greater than the slected threshold.

2. The monitor circuit according to claim 1 wherein said clock rate means is comprised of:

a first capacitor means for receiving said clock signal, said capacitor means being charged and discharged by the amplitude transitions of said clock signal;
   a second capacitor means connected to sense the charge on said first capacitor and for storing a portion of the charge for a period of time greater than one amplitude transition of said clock signal;
   a diode means connected to said second capacitor means for passing current in one direction when the charge on said second capacitor means is above a selected level corresponding to the rate of said clock signal; and a third capacitor means connected to said diode means for storing the passed current from said diode means as a charge and for providing said condition signal when the stored charge on said third capacitor means reaches the selected level.

3. The monitor circuit according to claim 2 wherein said third capacitor means is comprised of:
   a first capacitor connected between said diode means and a reference point;
   a first resistor connected to said first capacitor;
   a second resistor for connecting said first resistor to said second supply voltage; and
   a second diode means connecting the juncture of said first and said second resistors to the corresponding input of said second differential means.

4. The monitor circuit according to claim 1 wherein said first differential means is comprised of:
   a pair of transistors, each of said transistors, having base, emitter and collector electrodes;
   a first resistor connecting the emitters of said pair of transistors to said first supply voltage;
   a second resistor connecting the base of one of said pair of transistors to said first supply voltage;
   a third resistor connecting the base of said one of said pair of transistors to a common potential point;
   a fourth resistor connecting the collector of the other of said pair of transistors to said second supply voltage;
   the base of said other transistor being connected to said reference voltage, the collector of said one transistor connected to a common potential point; and
   a diode coupler connecting the collector of said other transistor to said second differential means.

5. A monitor circuit for sensing the supply voltages and the rate of a clock signal applied to an electronic circuit and for providing a monitor output signal the state of which indicates the condition of the supply voltages and clock signal, comprising in combination:
   a reference voltage signal source;
   a first differential means for comparing the amplitude of a first supply voltage against the amplitude of said reference voltage signal and providing an output proportional to the difference between said amplitudes;
   clock rate means for sensing said clock signal and for providing a condition signal of one state when the sensed clock signal has a rate equal to or above a desired rate and for providing a condition signal of a second state when the sensed clock signal has a rate below the desired rate; and
   a second differential means for comparing the amplitude of a second supply voltage against the amplitude of said reference voltage signal and for comparing the difference between the amplitude of said second supply voltage and the amplitude of said reference voltage against the state of the condition signal and said first differential means output signal to provide said monitor output signal, one state of which indicates that the difference between all compared signals is equal to or less than a selected threshold value and another state of which indicates that the difference between all compared signals is greater than the selected threshold value.

6. The monitor circuit according to claim 5 wherein said clock rate means is comprised of:
   a first capacitor means for receiving said clock signal, said capacitor means being charged and discharged by the amplitude transitions of said clock signal;
   a second capacitor means connected to sense the charge on said first capacitor and for storing a portion of the charge for a period of time greater than one amplitude transition of said clock signal;
   a diode means connected to said second capacitor means for passing current in one direction when the charge on said second capacitor means is above a selected level corresponding to the rate of said clock signal; and
   a third capacitor means connected to said diode means for storing the passed current from said diode means as a charge and for providing said condition signal when the stored charge on said third capacitor means reaches the selected level.

7. The monitor circuit according to claim 6 wherein said third capacitor means is comprised of:
   a first capacitor connected between said diode means and a reference point;
   a first resistor connected to said first capacitor; a second resistor for connecting said first resistor to said second supply voltage; and
   a second diode means connecting the juncture of said first and said second resistors to the corresponding input of said second differential means.

8. The monitor circuit according to claim 5 wherein said first differential means is comprised of:
   a pair of transistors, each of said transistors having base, emitter and collector electrodes;
   a first resistor connecting the emitters of said pair of transistors to said first supply voltage;
   a second resistor connecting the base of one of said pair of transistors to said first supply voltage;
   a third resistor connecting the base of said one of said pair of transistors to a common potential point;
   a fourth resistor connecting the collector of the other of said pair of transistors to said second supply voltage;
   the base of said other transistor being connected to said reference voltage, the collector of said one transistor connected to a common potential point; and
   a diode coupler connecting the collector of said other transistor to said second differential means.

* * * * *